(12) United States Patent
Shaw et al.

(10) Patent No.: US 7,216,872 B1
(45) Date of Patent: May 15, 2007

(54) SEAL FOR USE WITH PIPE AND FLANGE ASSEMBLIES

(75) Inventors: Michael N. A. Shaw, Tomball, TX (US); Bruce A. Wallace, Tomball, TX (US)

(73) Assignee: Oceaneering International, Inc., Houston, TX (US)

( * ) Notice: Subject to any disclaimer, the term of this patent is extended or adjusted under 35 U.S.C. 154(b) by 47 days.

(21) Appl. No.: 11/262,469

(22) Filed: Oct. 28, 2005

(51) Int. Cl.
*F16J 15/18* (2006.01)
*F16L 21/05* (2006.01)
*F16L 5/02* (2006.01)
*F16L 17/00* (2006.01)
*E21B 33/12* (2006.01)

(52) U.S. Cl. ............ 277/510; 277/529; 277/540; 277/603; 277/607; 277/619; 277/644; 166/115; 285/351

(58) Field of Classification Search ............ 277/327, 277/337–338, 340, 342, 510–511, 529, 532, 277/607, 626–627, 644, 647; 285/345–346, 285/351–352; 166/115–116, 141–142
See application file for complete search history.

(56) References Cited

U.S. PATENT DOCUMENTS

| | | | | |
|---|---|---|---|---|
| 2,420,929 A | * | 5/1947 | Buffington et al. ......... | 277/438 |
| 2,968,516 A | * | 1/1961 | Jarvis ..................... | 277/566 |
| 4,040,636 A | * | 8/1977 | Albertson et al. .......... | 277/562 |
| 4,635,945 A | * | 1/1987 | Beck ..................... | 277/530 |
| 5,056,830 A | | 10/1991 | Reaux | |
| 5,209,522 A | | 5/1993 | Reaux | |
| 5,309,993 A | * | 5/1994 | Coon et al. ............... | 166/115 |
| 5,433,482 A | | 7/1995 | Baddour | |
| 5,456,501 A | | 10/1995 | Reaux | |
| 5,551,703 A | * | 9/1996 | Morvant .................. | 277/584 |

OTHER PUBLICATIONS

Informational Brochure, "For performance you can count on specify genuine Viton fluoroelastomers for reliable components", Viton, Feb. 2002, 8 pages.
Informational Material, "Hytrel TPC-ET", Distrupol, Feb. 2005, 2 pages.
Informational Brochure, "Design Guide—Module V, Hytrel thermoplastic polyester elatomer", Hytrel, 2000, 62 pages.
Technical Information "B-600", Viton, Feb. 2003, 4 pages.
Information Brochure, "Compatibility of Sealing Materials with SOUR-Gas", Economos, 2001, 5 pages.

* cited by examiner

*Primary Examiner*—Vishal Patel
(74) *Attorney, Agent, or Firm*—Duane Morris LLP

(57) ABSTRACT

The invention relates to a seal for use with a pipe and flange assembly. The seal is intended to prevent leakage during axial movement of the pipe relative to a flange. The invention comprises a central cylindrical elastomeric member located between two circular elastomeric end rings.

20 Claims, 3 Drawing Sheets

SEAL FOR USE WITH PIPE AND FLANGE ASSEMBLIES

FIELD OF THE INVENTION

The invention relates to a seal for use with a pipe and flange assembly. The seal is intended to prevent leakage during axial movement of the pipe relative to a flange. The invention comprises a central cylindrical elastomeric member located between two circular elastomeric end rings

BACKGROUND OF THE INVENTION

Seals are used in conjunction with pipe and flange assemblies, such as those disclosed in U.S. Pat. Nos. 5,056,830 and 5,209,522 to Reaux. Prior art seals can be subject to failure as explained in U.S. Pat. No. 5,209,522 to Reaux at column 1, lines 16–23. Additionally, such seals are often used in the presence of hydrogen sulfide gas, commonly referred to as "sour gas." Prior art seals have been subject to deterioration in a sour gas environment.

It is also desirable in certain applications, to use such sealing arrangements with thin walled pipe. Prior art seals can cause the buckling of thin wall pipe, due to excessive rigidity. The present invention also provides a seal for use with a pipe and flange assembly that will have an improved lifetime in a sour gas environment as compared to prior art seals, and be less prone to cause the buckling of thin walled pipe than prior art seals.

DETAILED DESCRIPTION OF THE PREFERRED EMBODIMENTS

Figure 1:
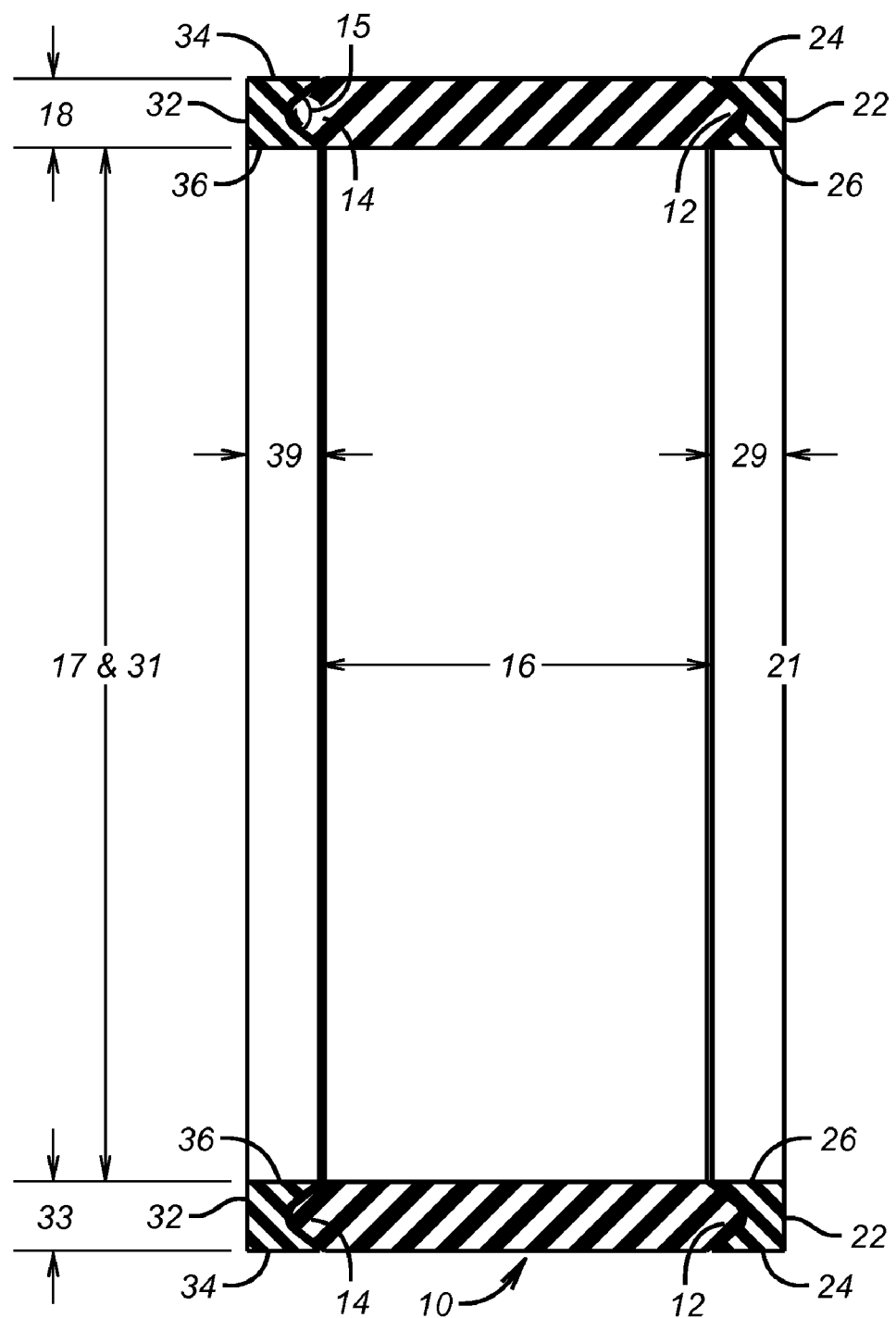
FIG. 1 is a side cross sectional view of the present invention.
Figure 2:
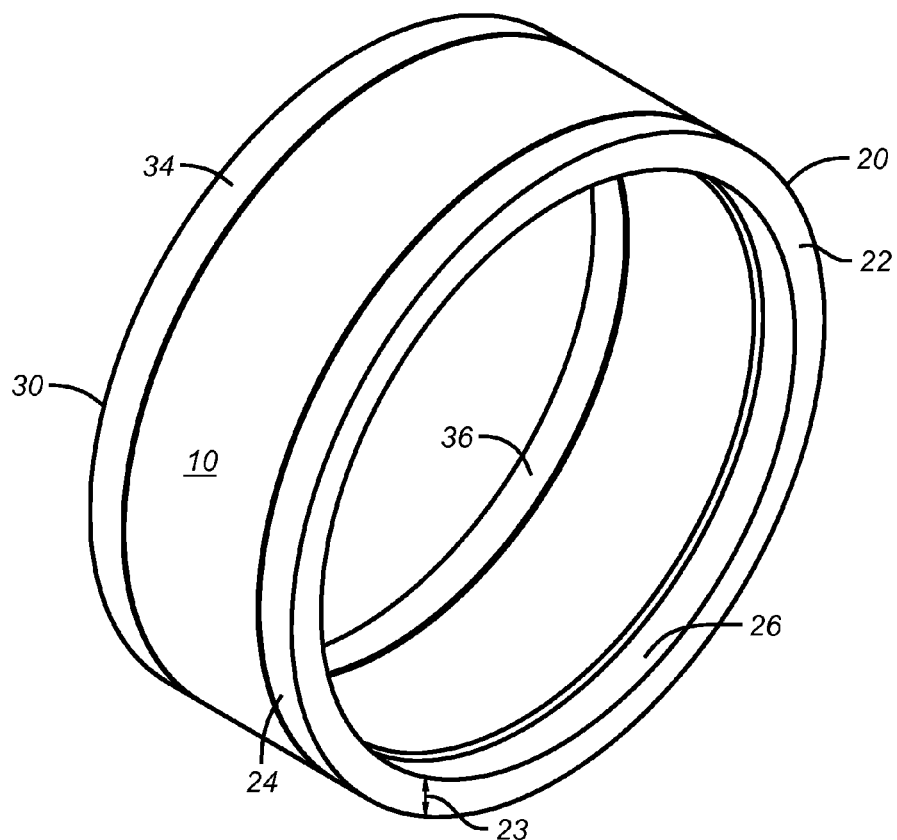
FIG. 2 is an isometric view of the present invention.
Figure 3:
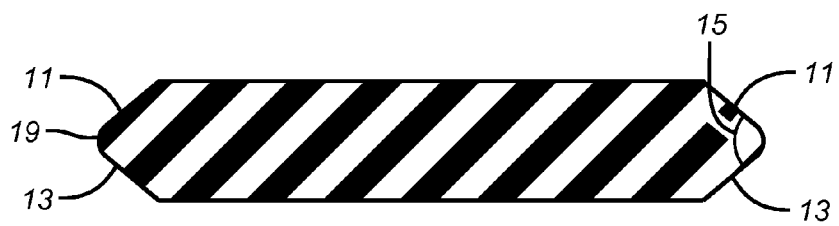
FIG. 3 is an exploded cross sectional view of the central elastomeric member of the present invention.
Figure 4:
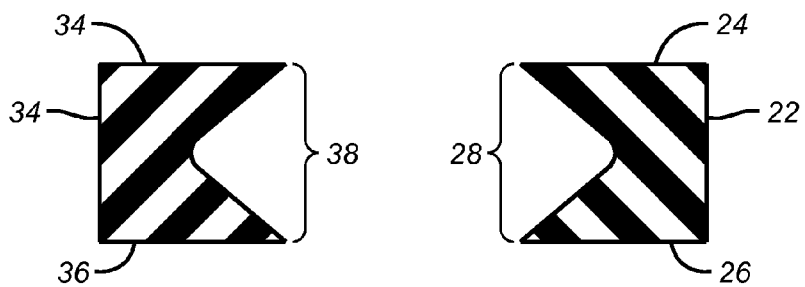
FIG. 4 is an exploded cross sectional view of the first and second end rings of the present invention.

The present invention is a seal for use with a pipe and flange assembly. It may be mechanically set using a piston, of the type disclosed in U.S. Pat. Nos. 5,056,830 and 5,209,522 to Reaux. The present invention is intended for use with pipes having diameters of varying sizes. Thus, several dimensions of the present invention will vary as a function of the pipe diameter with which the invention is used. Various preferred embodiments of the invention, as described below, are depicted in FIGS. 1–5.

In a preferred embodiment, this invention comprises a central cylindrical elastomeric member 10 having a double tapered first edge 12 and a double tapered second edged 14 located opposite the first edge. In a preferred embodiment, the first and second edges comprise an outer surface 11 and an inner surface 13 which intersect to define and acute angle 15 in the range of 60–85 degrees. This angular range provides for an improved coupling of the central cylindrical member with other components of the present invention, as explained below. The first and second edges further comprise a curved surface 19 at the region of intersection of the outer and inner surfaces.

In a preferred embodiment, the central cylindrical elastomeric member has a hardness in the range of 50–60 Shore A. The minimum hardness is selected to preclude an undesirable level of seal extrusion, which could lead to seal failure. The upper hardness limit is selected to allow the seal to conform to the shape of the pipe onto which it will be installed in normal usage. Excessive seal hardness can lead to mechanical damage of the pipe. In a preferred embodiment, the central cylindrical elastomeric member has a tensile strength in the range of 1810–2150 pounds per square inch (psi). The upper and lower tensile strength limits are selected to be compatible with the hardness limits, discussed above.

In a preferred embodiment, the central elastomeric member defines a known inner diameter and has a width 16 in the range of 34–134% of its inner diameter. The lower limit of the width range is selected to avoid over compression. The upper limit of the width range is selected to allow the seal to reach adequate pre-compression when used with pipe and flange assemblies, such as those disclosed in U.S. Pat. Nos. 5,056,830 and 5,209,522 to Reaux.

In another preferred embodiment, the central elastomeric member has a thickness 18 in the range of 6–21% of its inner diameter. This thickness range is believed to be optimal for the annular gaps present in known pipes and flanges of the type U.S. Pat. Nos. 5,056,830 and 5,209,522 to Reaux. In a preferred embodiment, the curved surface has a radius of curvature in the range of 1.0–3.5% of the inner diameter of the central elastomeric member. This radius of curvature provides for a snug coupling of the central elastomeric member with other elements of the present invention.

In a preferred embodiment, the central elastomeric member is made from an elastomeric polymer. This material is resistant to deterioration in a sour gas environment. In another preferred embodiment, the central elastomeric member comprises a terpolymer of hexafluoropropylene, vinylidene fluoride, and tetrafluoroethylene. In another preferred embodiment, the central elastomeric member is made from a fluroelastomer of the type sold under the trademark VITON B-600 by DuPont Performance Elastomers LLC of Wilmington, Del. VITON is resistant to deterioration in a sour gas environment and has desirable mechanical properties for use in the present invention.

A preferred embodiment of the present invention further comprises a first elastomeric end ring 20 contacting the first edge. This end ring comprises an outer face 22, an upper face 24, a lower face 26, and a receiving face 28 which are sized and shaped to snugly receive the first edge. In a preferred embodiment, the first elastomeric ring further has a hardness in the range of 55–75 Shore D. This hardness range is selected to ensure adequate minimum strength without causing mechanical damage to the pipe with which the present invention may be used. In a preferred embodiment, the first elastomeric end ring has a tensile strength in the range of 6700–7700 psi. The upper and lower tensile strength limits are selected to be compatible with the hardness limits, discussed above.

A preferred embodiment of the present invention further comprises a second elastomeric end ring 30 contacting the first edge. This end ring comprises an outer face 32 an upper face 34 a lower face 36 and a receiving face 38 which are sized and shaped to snugly receive the second edge. In a preferred embodiment the second elastomeric ring further has a hardness in the range of 55–75 Shore D, and a tensile strength in the range of 6700–7700 psi. The mechanical properties of the second elastomeric end ring are selected for the same reasons as explained above for the first elastomeric end ring.

Each receiving face 28 and 38 grips the first or second tapered edge, respectively. In a preferred embodiments these receiving faces comprise two opposing faces adjacent to outer face 11 and inner face 13, respectively, and defining an angle in the range of 60–85 degrees. This lower angular limit is selected to prevent the end ring from becoming too long and there by adversely affecting its cost and weight. The upper angular limit is selected prevent an unacceptable loss of flexibility that could allow the first or second tapered edges to flow past the receiving faces during compression of the seal. These angular ranges are also selected to provide a snug fit with the first and second tapered edges.

In a preferred embodiment, the opposing faces intersect to define a curved region. In a preferred embodiment, the curved region of the receiving faces has a radius of curvature in the range of 0.9–2.0% of the inner diameter of the end ring on which the opposing faces are located. This range is selected to provide an optimal snug fit with the central elastomeric member.

When the present invention is used with a flange and piston assembly, of the type disclosed in U.S. Pat. Nos. 5,056,830 and 5,209,522 to Reaux compression by the piston causes the internal pressure in the seal to exceed the pipeline pressure sufficiently to prevent the pipeline product from escaping past the connector. The seal compression is sufficiently low to prevent buckling of the pipeline.

In a preferred embodiment, the first and second elastomeric end rings have a known inner diameter and have a width 29 and 39 in the range of 6–25% of each of their respective inner diameters. This range is selected to be compatible with flange and piston assemblies of the type disclosed in U.S. Pat. Nos. 5,056,830 and 5,209,522 to Reaux.

In another preferred embodiment, the first and second elastomeric end rings each have a thickness in the range of 6–21% of the nominal pipe diameter of a pipe to which they are intended to be affixed. This thickness range is believed to be optimal for the annular gaps present in known pipes and flanges of the type U.S. Pat. Nos. 5,056,830 and 5,209,522 to Reaux.

In a preferred embodiment, the first and second rings comprise polyester. This material is resistant to deterioration in a sour gas environment. In another preferred embodiment, the first and second rings are made from a polyester elastomer of the type sold under the trademark HYTREL by DuPont of Wilmington, Del. In another preferred embodiment, the first and second rings are made from a thermoplastic hydrolysis resistant polyurethane elastomer (TPU) of the type sold under the trademark XH-Ecopur by Ecoseal Tech Inc. of Houston, Tex. HYTREL and XH-Ecopur are resistant to deterioration in a sour gas environment and have desirable mechanical properties for use in the present invention.

Figure 5:
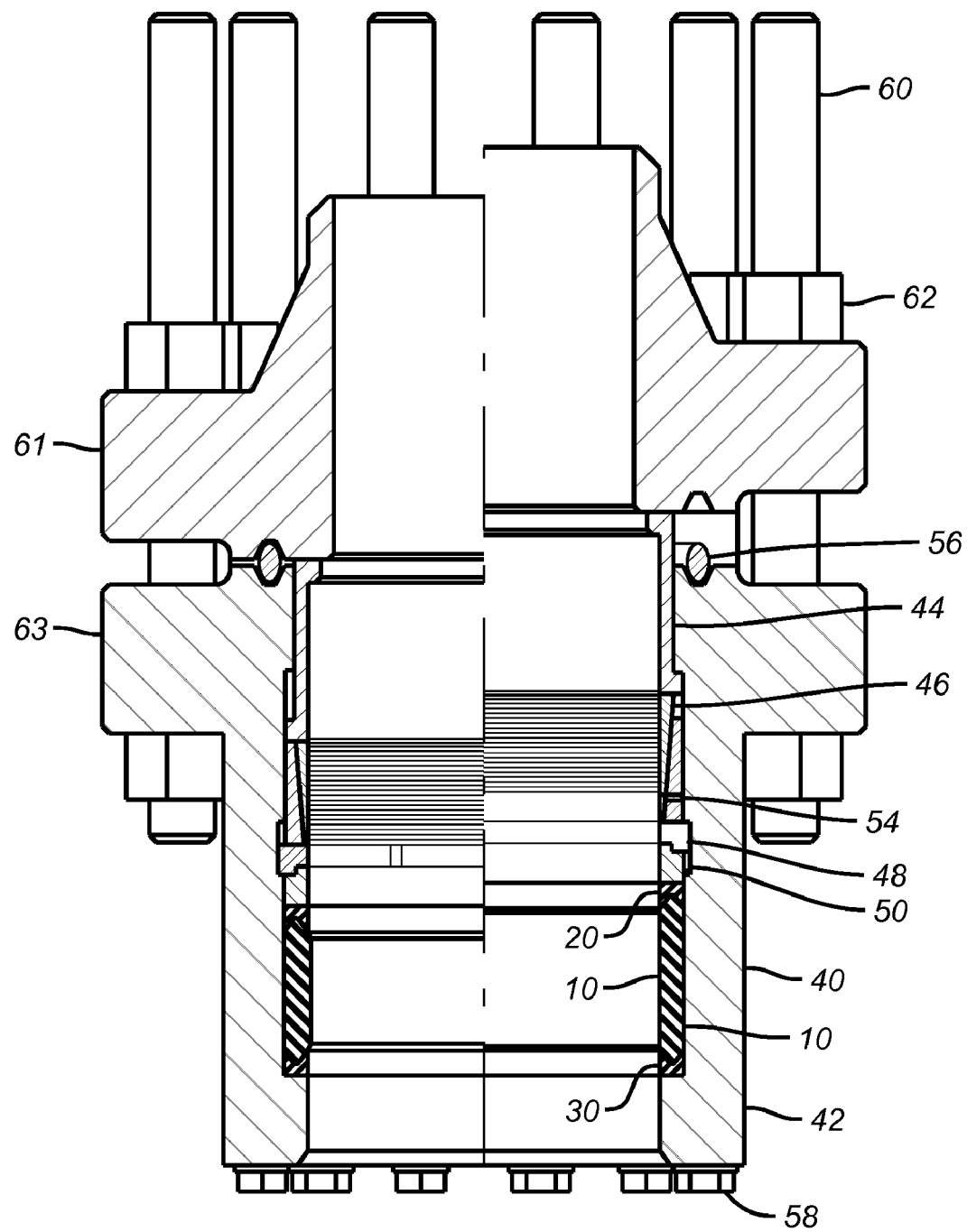
FIG. 5 is a side cross sectional view of the present invention installed on a pipe in conjunction with a flange assembly.

A preferred embodiment of the present invention installed on a pipe with a flange and piston assembly is shown in FIG. 5. Flange sections 61 and 63 are coupled together by threaded stud or bolt 60 and nut 62. Gasket ring 56 provides a fluid sealing function. A piston 44 is mounted on the pipe above slip 46. Shear pin 54 is mounted below slip 46. Segmented ring 48 is positioned adjacent backup ring 50. The seal of the present invention is positioned between the pipe and flange housing 40. End cap 42 is positioned below the flange housing. Screw head 58 is attached to the bottom of the assembly of FIG. 5. FIG. 5 is divided down the center.

The right side of FIG. 5 shows the assembly in the retracted position. The left side of Figure side shows the assembly in the energized position wherein the piston has been stroked.

The foregoing disclosure and description of the inventions are illustrative and explanatory. Various changes in the size, shape, and materials, as well as in the details of the illustrative construction and/or an illustrative method may be made without departing from the spirit of the invention.

What is claimed is:

1. A seal for use with a pipe and flange assembly, comprising:
   a. a central cylindrical elastomeric member having a double tapered first edge and a double tapered second edge located opposite said first edge, each of said edges comprising an outer surface and an inner surface intersecting to define an acute angle in the range of 60–85 degrees, and further comprising a curved surface at the region of intersection of each outer surface and inner surface, said elastomeric member having a hardness in the range of 50–60 Shore A and a tensile strength in the range of 1810–2150 psi;
   b. a first elastomeric end ring contacting the first edge, comprising an outer face, an upper face, a lower face, and a receiving face sized and shaped to snugly receive the first edge, said first elastomeric end ring having a hardness in the range of 55–75 Shore D, and a tensile strength in the range of 6700–7700 psi; and
   c. a second elastomeric end ring contacting the second edge, comprising an outer face, an upper face, a lower face, and a receiving face sized and shaped to snugly receive the second edge, said second elastomeric end ring having a hardness in the range of 55–75 Shore D, and a tensile strength in the range of 6700–7700 psi.

2. The seal of claim 1, wherein the central elastomeric member defines a known inner diameter and has a width in the range of 34–134% of its inner diameter.

3. The seal of claim 2, wherein the first and second elastomeric end rings have a known inner diameter and have a width in the range of 6–25% of each of their respective inner diameters.

4. The seal of claim 3, wherein the central elastomeric member has a thickness in the range of 6–21% of its inner diameter.

5. The seal of claim 4, wherein the first and second elastomeric end rings each have a thickness in the range of 6–21% of their respective inner diameters.

6. The seal of claim 5, wherein the width of each end ring is in the range of 6–21% of the width of the central elastomeric member.

7. The seal of claim 2, wherein the curved surface has a radius of curvature in the range of 1–3.5% of the inner diameter of the central elastomeric member.

8. The seal of claim 1, wherein the central elastomeric member is made from an elastomeric polymer.

9. The seal of claim 8, wherein the central elastomeric member comprises a terpolymer of hexafluoropropylene, vinylidene fluoride, and tetrafluoroethylene.

10. The seal of claim 1, wherein the first and second elastomeric end rings comprise polyester.

11. A seal for use with a pipe and flange assembly, comprising:
   a. a central cylindrical elastomeric member having a double tapered first edge and a double tapered second edge located opposite said first edge, each of said edges comprising an outer surface and an inner surface intersecting to define an acute angle in the range of 60–85 degrees, and further comprising a curved surface at the region of intersection of each outer surface and inner surface, said elastomeric member having a hardness in the range of 50–60 Shore A and a tensile strength in the range of 1810–2150 psi;

b. a first elastomeric end ring contacting the first edge, comprising an outer face, an upper face, a lower face, and a receiving face sized and shaped to snugly receive the first edge, said first elastomeric end ring comprising polyester and having a hardness in the range of 55–75 Shore D, and a tensile strength in the range of 6700–7700 psi; and c. a second elastomeric end ring contacting the second edge, comprising an outer face, an upper face, a lower face, and a receiving face sized and shaped to snugly receive the second edge, said second elastomeric end ring comprising polyester and having a hardness in the range of 55–75 Shore D, and a tensile strength in the range of 6700–7700 psi.

12. The seal of claim 11, wherein the central elastomeric member defines a known inner diameter and has a thickness in the range of 6–21% of its inner diameter.

13. The seal of claim 12, wherein the first and second elastomeric end rings have a known inner diameter and have a width in the range of 6–25% of each of their respective inner diameters.

14. The seal of claim 11, wherein each receiving face comprise two opposing faces defining an angle in the range of 60–85 degrees.

15. The seal of claim 14, wherein each intersecting pair of opposing faces intersects to define a curved region having a radius of curvature in the range of 0.9–2.0% of the inner diameter of the end ring on which the opposing faces are located.

16. The seal of claim 15, wherein the curved surface of the central elastomeric member has a radius of curvature in the range of 1.0–3.5 degrees.

17. A seal for use with a pipe and flange assembly, comprising:

a. a central cylindrical elastomeric member having a double tapered first edge and a double tapered second edge located opposite said first edge, each of said edges comprising an outer surface and an inner surface intersecting to define an acute angle in the range of 60–85 degrees, and further comprising a curved surface at the region of intersection of each outer surface and inner surface, said elastomeric member having a hardness in the range of 50–60 Shore A and a tensile strength in the range of 1810–2150 psi, said central elastomeric member defining a known inner diameter and having a width in the range of 34–134% of its inner diameter;

b. a first elastomeric end ring contacting the first edge, comprising an outer face, an upper face, a lower face, and a receiving face sized and shaped to snugly receive the first edge, said first elastomeric end ring having a hardness in the range of 55–75 Shore D, and a tensile strength in the range of 6700–7700 psi; and c. a second elastomeric end ring contacting the second edge, comprising an outer face, an upper face, a lower face, and a receiving face sized and shaped to snugly receive the second edge, said second elastomeric end ring having a hardness in the range of 55–75 Shore D, and a tensile strength in the range of 6700–7700 psi.

18. The seal of claim 17, wherein the central elastomeric member is made from an elastomeric polymer.

19. The seal of claim 18, wherein the central elastomeric member comprises a terpolymer of hexafluoropropylene, vinylidene fluoride, and tetrafluoroethylene.

20. The seal of claim 17, wherein the first and second elastomeric end rings comprise polyester.

* * * * *